United States Patent [19]
Johnson

[11] 3,815,823
[45] June 11, 1974

[54] STRAW CHOPPER ATTACHMENT FOR HARVESTER COMBINES

[75] Inventor: Orlin W. Johnson, East Moline, Ill.

[73] Assignee: International Harvester Company, Chicago, Ill.

[22] Filed: Feb. 27, 1973

[21] Appl. No.: 336,392

[52] U.S. Cl. ................. 239/650, 239/681, 241/190
[51] Int. Cl. ...................... A01f 29/00, A01c 15/00
[58] Field of Search ......... 241/189 R, 190; 239/650, 239/668, 669, 681, 683, 689

[56] References Cited
UNITED STATES PATENTS

| | | | |
|---|---|---|---|
| 2,670,775 | 3/1954 | Elofson | 239/650 X |
| 2,708,582 | 5/1955 | Adams | 239/650 |
| 2,986,186 | 5/1961 | White | 241/190 X |
| 3,005,637 | 10/1961 | Hetteen | 241/190 X |
| 3,350,017 | 10/1967 | Howell et al. | 241/190 UX |

*Primary Examiner*—Robert S. Ward, Jr.
*Attorney, Agent, or Firm*—F. David AuBuchon; Floyd B. Harman

[57] ABSTRACT

A straw chopper attachment of the type in which a deflector plate directs the straw toward and against a chopper blade rotor disposed within a hood and in which chopper blade wear may be compensated for by shifting the deflector plate toward the rotor to preserve a predetermined optimumm blade-to-plate clearance gap. The plate is pivoted within the hood for swinging movement toward and away from the rotor and the necessary adjustments may be made exteriorly of the hood without necessitating access to the latter.

10 Claims, 4 Drawing Figures

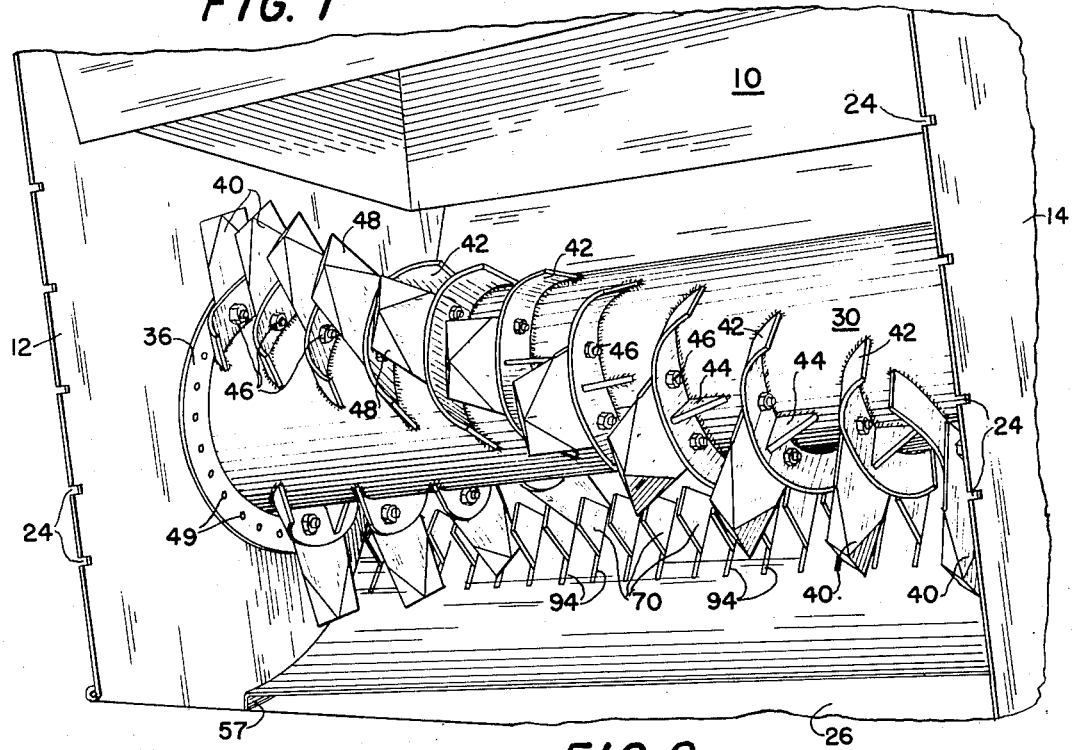
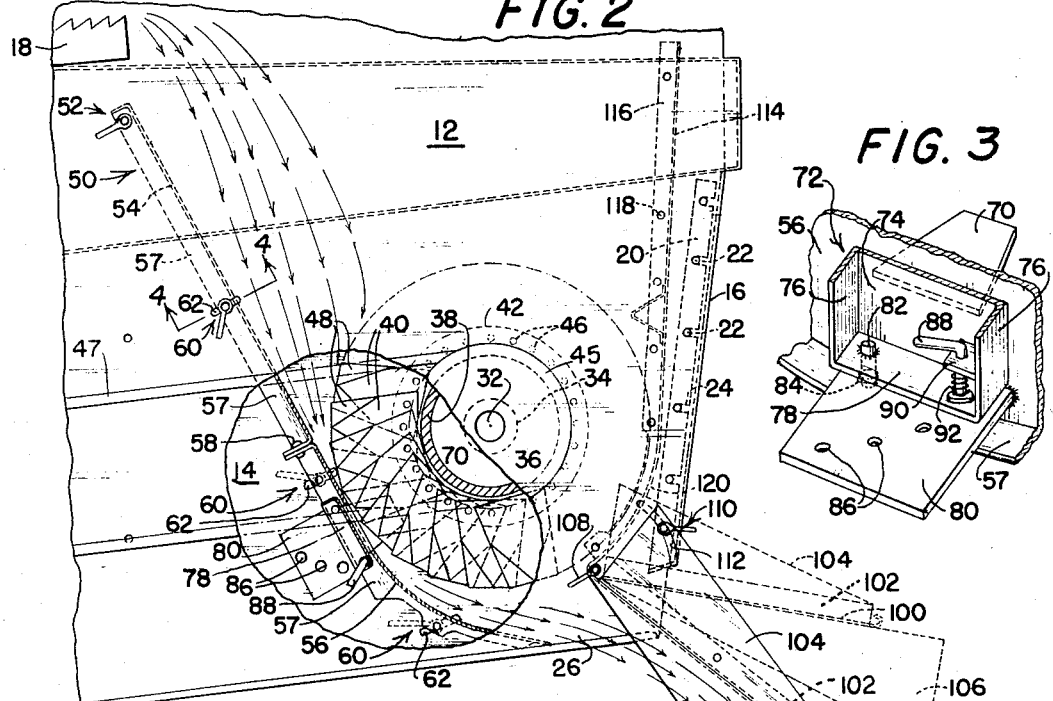
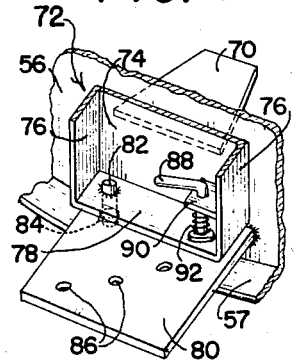
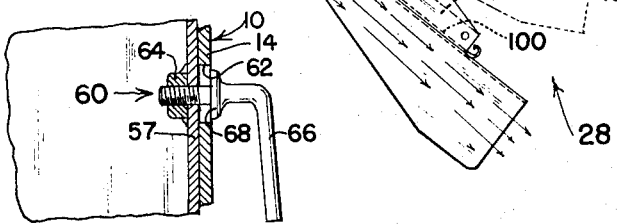

STRAW CHOPPER ATTACHMENT FOR HARVESTER COMBINES

The present invention relates to straw chopping apparatus and has particular reference to an improved straw chopping and spreading attachment for a harvester combine and by means of which the straw which is separated from the grain during the threshing operation is reduced to a finely divided state and uniformly distributed over the ground behind the combine. The primary prupose of thus treating straw, as well as husks, corn cobs and other separated material which is not otherwise to be conserved, is to reduce the material to a compost and spread it behind the combine.

The invention is specifically concerned with straw chopping apparatus of the general type shown and described in U.S. Pat. No. 3,350,017, granted on Oct. 31, 1967 and entitled "Straw Chopper and Spreader." As exemplified in such patent, this type of apparatus is in the form of an attachment which is capable of being readily installed within a combine hood and it embodies a series of rotary chopping blades which alternate with stationary reaction knives mounted on a straw deflector plate, the chopping blades, reaction knives and the plate cooperating with one another in cutting the straw which passes through the hood into relatively short lengths and thereafter discharging the same to a vaned outlet which causes the thus comminuted straw or other material to be uniformly distributed over the ground.

Straw chopping apparatus of this general type is possessed of certain limitations, principal among which is the tendency for material to build up on the deflector plate due to failure thereof to pass between the rotary chopping blades and the fixed knives. Careful analysis of this problem has revealed the fact that the outer ends of the rotary chopping blades are subject to considerable wear and that when they have become worn to such an extent that the clearance distance or gap between the tips of such blades and the deflector plate exceeds a predetermined maximum, clogging of the cutting area takes place so that no further material passes through such area and straw back-up takes place on the deflector plate. More specifically, it has been found that a gap which does not exceed one quarter of an inch produces ideal straw chopping results. It has been found that the optimum range for this clearance is between one-sixteenth of an inch to three-sixteenths of an inch. It has been found that in actual practice, after a period of prolonged use, an extent of as much as one-half inch becomes worn away from the tips of the rotary chopping blades. Such clogging takes place progressively due to material lying parallel to the axis of the rotor, collecting on the top edges of the stationary knives in the clearance between the deflector plate and the rotary chopper blades until the maximum tolerable wear has been reached and when this occurs no material whatsoever will pass the cutting area and the straw back-up rapidly builds up on the deflector plate and the back to the elevated straw walkers or racks from which the straw issues.

The present invention is designed to overcome the above noted limitation that is attendant upon conventional straw chopping apparatus and, toward this end, the invention contemplates the provision of a straw chopper attachment having novel means associated therewith wheereby, the deflector plate may be made readily adjusted to bring the gap between such coppper blades and the deflector plate within the predetermined optimum gap-tolerance. The provision of such a straw chopper attachment constitutes the principal object of the present invention and, in carrying out this object, the invention contemplates the provision of a knife-carrying deflector plate which is pivotally mounted for swinging movement toward and away from the mounting shaft for the rotary chopping blades, together with novel means whereby adjustment of the plate for proper plate-to-blade clearance may be conveniently effected from outside the combine hood without necessitating removal of the hood closure plate or otherwise gaining access to the interior of the hood.

A further object of the invention, in a straw chopper attachment of the character briefly outlined above, is to provide a novel mounting means for the fixed reaction knives whereby they may be adjustably secured to the pivoted deflector plate so as to vary their effective extent, and consequently to vary the degree of intermesh or overlap between the rotary cutter blades and the knives. By thus varying the position of the knives on the deflector plate, compensatory adjustments of these knives may be made which are commensurate with such adjustments as may be effected on the deflector plate for gap-control purposes. For example, if a deflector plate adjustment is made to compensate for a chopper blade wear on the order of 1½ inches as described above, an inordinate degree of knife and blade intermesh or overlap can be avoided by retracting the knives of the deflector plate a commensurate amount so that after both adjustments are made, a normal and approved knife-to-blade overlap will be present. Additionally, knife adjustment on the deflector plate independently of chopper blade wear may be resorted to to accommodate varying types of straw or other material, even to the point of complete knife retraction where there is no intermesh overlap, such a condition being desirable under certain circumstances, as for example when treating corn husks and cobs, or when windrowing.

A still further advantageous feature of the present straw chopper attachment resides in the provision of means for prolonging chopper blade life and consequently extending the usefulness of the attachment, the blades being reversible and cooperating with the adjustable deflector plate in precisely the same manner regardless of their reversed positions.

The provision of a straw chopper attachment which is relatively simple in its construction and which, therefore, may be manufactured at a low cost; one which may be manufactured as original equipment or which, alternatively, is capable of being constructed as a conversion unit by modifying existing straw chopper attachments; one which, when thus employed as a conversion unit, entails only slight modification of the discharge hood and its associated adjuncts; one which is rugged and durable and which therefore will withstand rough usage; and one which otherwise is well adapted to perform the services required of its, are further desirable features which have been borne in mind in the production and development of the present invention.

Other objects and advantages of the invention, not at this time enumerated, will become readily apparent as the nature of the invention is better understood.

3

In the accompanying single sheet of drawings forming a part of this specification, one illustrative embodiment of the invention has been shown.

BRIEF DESCRIPTION OF THE DRAWINGS

FIG. 1 is a fragmentary rear perspective view looking into the interior of the hood which is associated with the present straw chopper attachment and illustrating the manner in which the deflector plate or concave and its associated fixed knives cooperate with the rotary blades, the rear closure plate being removed in the interests of clarity;

FIG. 2 is a side elevational view partly in section of the structure shown in FIG. 1 with the rear closure plate replaced and with a portion of the hood side wall broken away;

FIG. 3 is an enlarged fragmentary detail perspective view of a knife adjusting mechanism employed in connection with the invention and showing the same operatively applied to the rear side of the knife-supporting deflector member; and FIG. 4 is an enlarged sectional view taken on the line 4—4 of FIG. 2.

Referring now to the drawings in detail and in particular to FIGS. 1 and 2, the straw chopper attachment of the present invention is designed for installation at the rear end region of a harvester combine and within the usual hood which ordinarily is associated with conventional combines, such hood during normal operation of the combine serving to discharge the straw which is received from the straw walkers directly onto the ground through the open bottom of the hood, thus forming a windrow behind the machine as the latter progresses forwardly. The present straw chopper attachment is capable of being used with a wide variety of harvester combines having straw discharge hoods and therefore it is deemed adequate for purposes of description herein, as well as to afford an environment for the present straw chopper attachment, to disclose only the hood which is designated by the reference numeral 10 and fragments of which appear in FIGS. 1, 2 and 4. For a fuller understanding of the general environment of a combine straw chopper reference may be had to U.S. Pat. No. 2,708,582, granted on May 17, 1955 and entitled "Straw Chopper and Spreader Attachment for Combines." The entire disclosure of such patent, insofar as it is consistent with the present disclosure, is hereby incorporated in and made a part of this application by reference thereto.

The hood 10, may be reagrded as a functional component of the straw chopper attachment and it is provided with side walls 12 and 14, and a removable rear wall 16 (FIG. 2). The disclosure of the combine hood herein is of a fragmentary nature, the usual hood top wall being omitted in the drawings.

The bottom of the hood also is open so that when the combine is not equipped with a straw chopper attachment, the straw leaving the straw walkers 18 will be discharged directly to the ground. The rear wall 16 is flanged as indicated at 20 and is adapted to be removably secured in place by means of fastening bolts 22 which are received in slots 24 formed in the rear edges of the side walls 12 and 14. The lower edge of the rear wall 16 terminates an appreciable distance above the lower edges of the side walls 12 and 14, thus defining a space which, in combination with the open bottom of the hood 10, defines a discharge opening or area 26 through which the chopped or comminuted straw is discharged at high velocity and in a manner that will be made clear presently. Material leaving the discharge opening 26 is directed toward the usual spreader mechanism 28.

The side walls 12 and 14 of the hood 10 serve to support therebetween a rotor assembly 30 (which hereinafter will be referred to simply as the rotor) and which embodies a central shaft 32 which is carried in bearings 34 which are mounted on the side walls 12 and 14, only one such bearing appearing herein in FIG. 2. The shaft 32 serves to support a pair of circular end plates 36 which, in turn, support therebetween a tubular blade-carrying shaft 38 which is concentric with the central shaft 32. The tubular shaft 38 has mounted thereon two diametrically disposed series of chopping blades 40, the blades of each series progressing in helical fashion around the shaft as clearly shown in FIG. 1 with equal spacing between adjacent blades. The individual blades 40 are fixedly secured to the tubular shaft 38 by means of bracket-like supports 42, each support being in the form of a strip of heavy gauge sheet material which is of arcuate configuration in the interest of rigidity, and which has its inner edge welded directly to the shaft 38. A medial gusset-like triangular web 44 is welded to each support 42 and to the shaft 38 and serves to further rigidify the blade support.

Each chopper blade 40 is generally rectangular in outline and has its inner or proximate end removably secured to the medial region of its respective support 42 by means of a pair of spaced apart clamping bolt and nut assemblies 46. The blade projects radially outwardly of the shaft 38 and the outer corner regions thereof are hardened as indicated at 48 to thus increase their useful life. The edges of the chopper blades 40 may be beveled to a sharp edge as indicated in the drawing or they can be squared to thus provide two cutting edges and a longer useful life. The blades 40, being thus removably mounted on their respective supports 42, may readily be reversed on the shaft 38 so as to further extend their useful life.

The circular end plates 30 are provided with a series of circumferentially spaced holes 49 therein, these holes being provided for reception of suitable counterbalancing weights (not shown) by means of which the rotor assembly 30 may be centrifugally balanced.

The rotor 30 is adapted to be driven at a relatively high speed in a counterclockwise direction as indicated by the arrow in FIG. 2 by means of a pulley 45 keyed to the central shaft 32 and which is connected by a belt 47 to an available output member on the combine.

In order to deflect straw issuing from the straw walkers 18 and falling by gravity downwardly, and to direct the same into operative cooperation with the rotor 30, a composite two-piece deflector plate 50 which is of full hood width extends across the hood interiorly thereof and is pivotally secured by nut and bolt assemblies 52 at its upper corner regions to the hood side walls 12 and 14 for swinging movement about a horizontal axis which is disposed in the vicinity of the straw walkers 18 and somewhat forwardly of the vertical plane of the rotor 30.

The composite deflector plate 50 is of a sectional nature and includes a shallow tray-like upper deflector section 54 and a lower curved or concave section 56 which arches beneath the front side of the rotor as shown in FIG. 2, the two sections being provided with marginal edge flanges 57 which not only rigidify the sections but which also afford a means whereby the two sections 54 and 56 may be riveted together as indicated at 58 to establish the composite deflector plate 50. The deflector plate extends downwardly from the region of the straw walkers 18 to substantially the level of the lower longitudinal edges of the side walls 12 and 14 and the forward lower edge of the lower plate section defines the lower edge of the aforementioned straw-discharge opening 26. The upper edge of such opening is defined by the lower edge of the removable rear wall 16.

As previously stated, the deflector plate 50 is capable of swinging movement about the horizontal axis established by the nut and the bolt assemblies 52, the pivot mounting for the plate being provided for the purpose of enabling the lower concave section 56 to be moved and adjusted toward and away from the rotor 30 to vary the distance or gap between the tips of the chopper blades 40 and the opposed curved surface of the plate section 56 for purposes that will be made clear presently. Accordingly, a series of four clamping devices in the form of bolt and handle-nut assemblies 60 cooperate with the flanges of the plate sections 54 and 56 on opposite sides and with respective slots 62 which are formed in the side walls 12 and 14 of the hood 10, in securing the plate 50 in selected adjusted positions, there being a total of eight such nut and bolt assemblies and slots. As shown in FIG. 4, each nut and bolt assembly includes a nut 64 which is welded to the adjacent flange, together with a handle type bolt 66 which passes through the associated slot 62, the bolt being provided with a clamping shoulder 68 which engages the adjacent hood side wall (12 or 14 as the case may be) when the assembly 60 is tightened and serves to draw the flange 57 and adjacent wall hard against each other to thus anchor the deflector plate in its adjusted position. The nut and bolt assemblies 52 are identical with the nut and bolt assemblies 60 but since the former assemblies establish a pivotal axis for the deflector plate 50, the bolt components of these assemblies pass through circular holes in the side walls 12 and 14 instead of through slots, as is the case with the assemblies 60. From the above description it will be apparent that when it is desired to effect an adjustment of the position of the deflector plate, it is merely necessary to loosen the two nut and bolt assemblies 52 and the eight nut and bolt assemblies 60, whereupon the deflector plate may be swung bodily about the axis of the nut and bolt assemblies 52 to the desired position, after which tightening of all these assemblies will serve to secure the plate in its adjusted position.

The chopper blades 40 are designed for cooperation with a series of stationary knives 70 which are adjustably mounted on the lower deflector plate section 54 by means of a pivoted knife carrier 72 the details of which are best shown in FIG. 4. This knife carrier is of shallow elongated tray-like construction and includes a back wall 74 having marginal side flanges 76 and end flanges 78. As shown in FIG. 2, the knife carrier 72 extends horizontally across the lower deflector plate section 56 and terminates a slight distance inwardly of the two side flanges 57 of such section. Interposed between the end flanges 78 of the carrier 72 and such side flanges at each end of the carrier is a substantially square fixed anchor plate 80 (FIG. 4), one edge of which is welded to the back face of the lower plate section 56. A pivot pin 82 is welded to each end flange 78 and projects downwardly into a hole 84 which is formed in the anchor plate 80, thus establishing a pivotal connection by means of which the knife carrier 72 may be swung toward and away from the deflector plate section 56. The anchor plate is formed with an arcuate series of spaced locating holes 86 therein, such holes being designed for selective reception of the forward end of a latch bolt 88 which is slidable in a guide plate 90 and the lower end of which projects through the end flange 78 and is capable of selective reception in the holes 86. A spring and washer arrangement 92 carried on the latch bolt 88 yieldingly urges the latter forwardly so that the forward end thereof is projected beyond the end flange 78 for cooperation with the various holes 86. The aforementioned knives 70 are suitably secured, as for example by welding, to the back wall 74 of the knife carrier 72 in end-to-face relationship, the individual blades being of plate-like trapezoidal configuration. The knives 70 are equally spaced along the back wall 74 and the spacing between adjacent knives is equal to the spacing between the helically arranged chopper blades 40 on the rotor 30. A series of narrow slots 94 (FIG. 1) are formed in the lower deflector plate section 56 for reception therethrough of the knives 70, the extent of projection of the knives through such slots being dependent upon the angularity which the knife carrier 72 assumes relative to the plate section as determined by the locating holes 86. The disposition of the knives 70 on the knife carrier 72 and of the slots 94 is such that the projecting portions of such knives enter between adjacent chopper blades in interlacing relationship as is customary in connection with straw chopper attachments of the type under consideration.

The purpose of the pivoted adjustable knife carrier 72 is to accommodate different materials undergoing chopping by varying the depth of cut. Of the four locating holes 86 which are provided in the anchor plate 80, the hole closest to he deflector plate section 56 is for effecting a relatively fine cut. The next adjacent hole is for effecting a medium cut. The hole which is twice removed from the plate section 56 is for effecting a coarse cut, and the last hole is so positioned that when the latch bolt 88 is projected thereinto, the knives 70 are completely withdrawn from the sphere of influence of the chopper blades 40.

The spreader mechanism 28 is similar to that shown and described in the aforementioned U.S. Pat. No. 3,350,017 and no claim is made herein to any novelty associated therewith. Briefly, such mechanism involves in its general organization a flat baffle plate 100 having upstanding side flanges 102 which are riveted to upright trapezoidal side plates 104 and from which there depend a series of outwardly flaring and diverging deflector vanes 106. The proximate lower corners of the side plates 104 are pivotally connected by nut and bolt assemblies 108, similar to the assemblies 52, to the hood side walls 12 and 14. Additional nut and bolt assemblies 110 are carried by the side walls 12 and 14 and are adapted to traverse a pair of arcuate slots 112 formed in the side plates 104 for locking the baffle plate 100, and consequently the vanes 106 carried thereby, in selected positions of angularity and elevation.

A rear deflector plate 114 of full hood width is provided immediately forwardly of the removable rear wall 16, is provided with side flanges 116 which are secured by bolts 118 to the hood side walls 12 and 14, and is formed with a curved lower section 120 which arches forwardly beneath the rotor 30. This deflector plate 114 is provided for the purpose of preventing the chopped material from by-passing the discharge outlet 26 and flowing upwardly and reentering the hood above the rotor.

In the operation of the herein described straw chopper attachment, straw or other material which is to be treated is discharged from the straw walkers or racks 18 and falls by gravity onto the deflector plate 50, from whence it passes rearwardly and downwardly over the surface of such plate and into contact with the closely interfitting or interlaced chopper blades 40 and knives 70 which function to reduce the straw to small segments. Depending upon the character of the material undergoing treatment, the knife carrier 72 will be preset in the manner previously described for optimum cutting efficiency. Since the rotor 30 rotates in a counterclockwise direction as viewed in FIG. 2, there is a tendency for the material to be forcibly projected downwardly and forwardly under the impelling influence of the rotor blades which causes the chopped material to slide over the surface of the curved deflector plate section 56. The material is thus projected toward and through the discharge opening or area 26 where it encounters the spreader mechanism 28 and is distributed over the surface of the ground in the usual manner of operation of such spreader mechanisms.

At such time as it is determined that the chopper blades 70 have become worn, as evidenced by a commencement of a straw back-up on the upper section 54 of the composite deflector plate 50, or by failure of the chopped straw to issue from the combine, the deflector plate 50 may be adjusted to attain the desired clearance or gap between the tips of the chopper blades 70 and the surface of the plate 50 by the simple expedient of loosening all of the nut and bolt assemblies 60, and also the assembly 52, thus freeing the plate 50 for swinging movement about the horizontal axis of the nut and bolt assemblies 52. It is not necessary that any of these nut and bolt assemblies be completely removed and the loosening operations may be performed from outside the combine hood 10. After the assemblies are all loosened, the handle bolts 66 associated with the lowermost nut and bolt assemblies may be employed as torque-applying members for swinging the entire deflector plate 50 rearwardly a slight distance, the proper distance being readily estimated by the operator without requiring access to the interior of the hood, thus bringing the blades 40 and plate 50 within the predetermined degree of gap tolerance. Thereafter the various nut and bolt assemblies may be tightened and the combine set into operation.

The invention is not to be limited to the exact arrangement of parts shown in the accompanying drawings or described in this specification as various changes in the details of construction may be resorted to without departing from the spirit of the invention. Therefore, only insofar as the invention has particularly been pointed out in the accompanying claims is the same to be limited.

What is claimed is:

1. In a straw chopper for a harvester combine, a hood adapted to receive straw in the upper region thereof and having opposed side walls, a rear end wall and an open bottom, a rotor mounted for rotation about a transverse horizontal axis within said hood in the lower region thereof and adjacent said rear wall, a plurality of chopper blades mounted on and projecting radially outwardly of the rotor, a rearwardly and downwardly inclined straw deflector plate disposed within said hood, bridging the distance between said side walls, having its upper end underlying the region of straw introduction into the hood, and having a curved lower region which arches around and beneath the rotor, the lower edge of said deflector plate, in combination with the lower edge of said rear wall, defining a discharge area for chopped straw, means pivotally connecting the upper edge region of said deflector plate to said side walls for swinging movement of the plate toward and away from the rotor to vary the clearance distance between the outer ends of said chopper blades and plate, said side walls being formed with a pair of opposed clearance openings therein, and clamping means, projecting through said openings, and accessible for manipulation exteriorly of the hood for releasably clamping said plate in selected positions of adjustment to thus maintain an optimum clearance between the outer ends of said chopper blades and said plate between one-sixteenth of an inch and three-sixteenths of an inch.

2. In a straw chopper, the combination set forth in claim 1, wherein said clamping means for releasably clamping the plate in selected positions of adjustment comprises a bolt projecting through each of said openings and threadedly received in said plate, and means defining a clamping shoulder which is engageable with the rim region of such opening upon tightening of the bolt for drawing the associated side wall and plate hard against each other.

3. In a straw chopper, the combination set forth in claim 2, wherein each clearance opening is in the form of an arcuate slot, and the bolt is in the form of a handle bolt on which said clamping shoulder is integrally formed.

4. In a straw chopper, the combination set forth in claim 3, wherein the means for pivotally connecting the upper edge region of said deflector plate to said side walls comprises a pair of additional handle bolts which project through circular holes in the respective side walls and are threadedly received in the edge region of said deflector plate.

5. In a straw chopper for a harvester combine, a hood adapted to receive straw in the upper region thereof and having opposed side walls, a rear end wall and an open bottom a rotor mounted for rotation about a transverse horizontal axis within said hood in the lower region thereof and adjacent said rear wall, a plurality of chopper blades fixedly mounted on and projecting radially outwardly of the rotor, a rearwardly and downwardly inclined straw deflector plate having laterally turned side flanges and disposed within said hood, bridging the distance between said side walls, having its upper end underlying the region of straw introduction into the hood, and having a curved lower region which arches around and beneath the rotor, the lower edge of said deflector plate, in combination with the lower edge of said rear wall, defining a discharge area for chopped straw, means pivotally connecting the upper edge region of said deflector plate to said side walls for swinging movement of the plate towards and away from the rotor to vary the clearance distance between the outer ends of said chopper blades and plate, said means comprising a nut welded to each side flange, a pivot bolt threadedly received in said nut and projecting laterally outwardly through a hole which is provided in the adjacent side wall, and a clamping shoulder on said bolt exteriorly of the hood and effective upon tightening of the bolt to clamp said side flange and wall together against relative movement therebetween, and additional clamping means effective in the lower region of said plate for clamping the latter in selected positions of adjustment, said latter means comprising a clamping nut welded to each side flange, a clamping bolt threadedly received in said clamping nut and projecting laterally outwardly through an arcuate slot which is provided in the adjacent side wall of the hood, and a clamping shoulder on said clamping bolt exteriorly of the hood and effective upon tightening of the clamping bolt to clamp said side flange and wall together against relative movement.

6. In a straw chopper for a harvester combine, the combination set forth in claim 5, wherein each of said bolts is in the form of a handle bolt having a laterally turned handle portion which is accessible exteriorly of the hood for application of manual torque to said deflector plate in order to swing the latter toward and away from said rotor for adjusting purposes.

7. In a straw chopper, the combination set forth in claim 5 including, additionally, a plurality of reaction knives carried by said deflector plate in the lower region thereof and movable bodily with the plate, into and out of shearing cooperation with the blades on said rotor.

8. In a straw chopper, the combination set forth in claim 7, wherein the blades on said rotor are disposed in plural and generally longitudinally extending rows with equal spacing between adjacent blades, the knives on said plate are disposed in a single row which extends transversely of the plate with equal spacing between adjacent knives, the blades and knives being staggered relative to each other whereby, upon swinging movement of the plate toward said rotor, progressive degrees of blade and knife interlacing will take place.

9. In a straw chopper, the combination set forth in claim 8, wherein said rotor is comprised of a hollow tubular shaft of relatively large diameter, a plurality of flat arcuate blade supports are welded to the outer surface of said shaft in wrap-around on-edge fashion, the chopper blades are secured by bolts to the medial regions of the supports for reversibility thereof to interchange the leading and trailing edges thereof, and gusset webs are welded to the supports in the medial regions thereof and to the shaft for rigidifying purposes.

10. In a straw chopper, the combination set forth in claim 9, wherein said reaction knives are fixedly mounted on a carrier on the side of the deflector plate remote from said rotor, project through slots which are formed in the plate, the carrier is pivotally mounted on the plate, and latch means are provided for anchoring the carrier in selected positions relative to the plate to vary the extent of projection of the knives through said slots.

* * * * *